Oct. 31, 1961   R. C. BAKER   3,006,183
GAGING DEVICE
Filed April 3, 1958
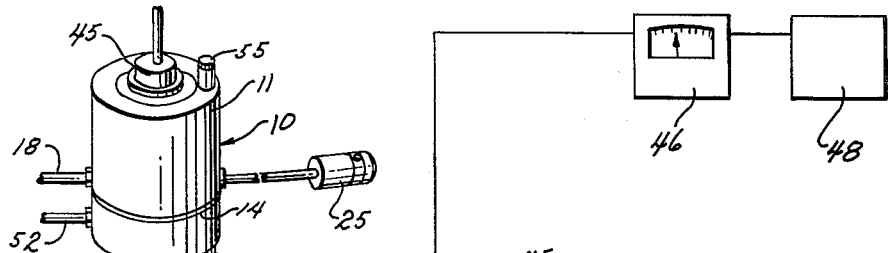
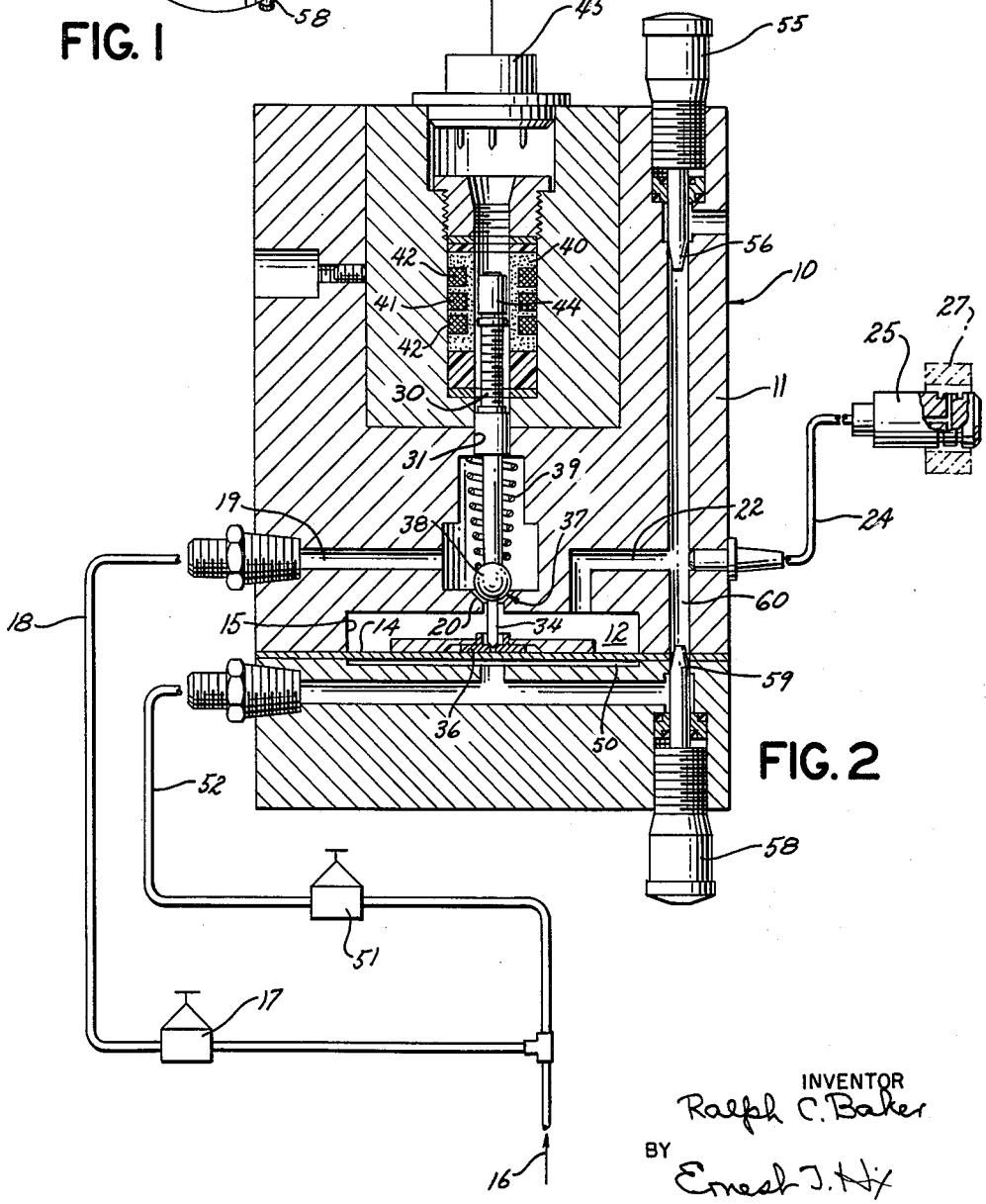
INVENTOR
Ralph C. Baker
BY
Ernest J. Hix
ATTORNEY 3,006,183
GAGING DEVICE
Ralph C. Baker, Dayton, Ohio, assignor to The Sheffield Corporation, Dayton, Ohio, a corporation of Delaware
Filed Apr. 3, 1958, Ser. No. 726,104
7 Claims. (Cl. 73—37.9)

This invention relates to gaging apparatus and more particularly to apparatus for measuring work dimensions and the like.

It is an object of this invention to provide a fluid type gaging apparatus for measuring work dimensions or other product characteristics, the apparatus having features of simplicity, flexibility in application, and extremely rapid gaging responses of high precision.

It is a further object to provide a gaging apparatus including control means for maintaining a constant fluid supply pressure to a gage head wherein variable flow takes place as determined by a dimension or other characteristic gaged, the pressure control means also controlling gaging means of high precision whereby rapid gaging responses are obtained in response to changes in flow at the gage head.

It is a further object to provide such an apparatus having a chamber with an outlet to a flow controlling gage head and a movable valve member to control supply flow into the chamber and maintain a constant chamber pressure irrespective of flow through the gage head, gaging means being provided directly responsive to positions of said valve member as determined by a work dimension or other gaged characteristic.

It is a further object to provide such an apparatus wherein the pressure chamber has a movable wall portion such as a diaphragm or the like responsive to pressure within the chamber and positioning the valve member to control inlet flow and maintain the chamber pressure constant, constant presssure means being operative against said diaphragm in opposition to chamber pressure to determine the pressure level of operation.

It is a further object to provide such an apparatus wherein the opposing pressure is provided by a second fluid pressure chamber at the opposite side of said movable wall portion having its own fluid pressure supply to provide a controllable pressure acting in opposition to pressures within said first fluid pressure chamber.

It is a further object to provide an apparatus as referred to above including an adjustable valve for controlling flow between the chambers to control the effective amplification of the apparatus.

It is a further object to provide such an apparatus including an adjustable bleed to atmosphere from the pressure chamber whereby the reference level of response can be adjusted prior to gaging.

Other objects and advantages of the invention will be apparent from the following description, the appended claims, and the accompanying drawing, in which, FIGURE 1 illustrates in perspective a gaging apparatus embodying the present invention, and FIGURE 2 is a vertical central section through the apparatus of FIGURE 1.

The present invention has special application in fluid pressure gaging systems for measuring dimensions or other product characteristics. It has been illustrated in an exemplary embodiment and will be described as applied to an air gage for checking the internal diameter of a workpiece.

Essentially the apparatus is of a unique type wherein a pressure controlling member maintaining pressure under varying flow conditions through a gage head is operatively connected to a gaging device to determine a work dimension or other gaged product characteristic.

A pressure chamber is provided in an auxiliary regulator means between a supply regulator and a flow controlling gage head. The pressure controlling member is operative to control flow from the supply into the chamber and maintain the chamber pressure constant. Precision gaging means directly measure the positions of this member during its pressure maintaining operation. Because flow varies with the dimension or other characteristic gaged the resulting positions of the controlling member are flow responsive and determined by the work dimension itself.

The flow paths from the pressure controlling member through the chamber to the gage head, and from the constant pressure supply to the controlling member are unrestricted so that flow changes at the gage head are substantially instantly detected and compensated for to maintain the chamber pressure constant. This occurs rapidly without delays for pressure build-up and irrespective of remoteness of the gage head. Minute pressure changes resulting from changing flows through the gage head are detected and compensated for as they occur with a resulting positioning of the flow controlling member in accordance with the gaged dimension.

Referring more particularly to the drawing, the exemplary apparatus 10 illustrated includes a body 11. A gaging chamber 12 is provided in body 11 having one wall formed by a flexible pressure responsive diaphragm 14 cooperating with a depression 15 at the lower end of body 11 as seen in FIGURE 2.

Air under pressure is supplied to chamber 12 from a pressure source indicated at 16, through regulator 17, tube 18, passage 19, valve seat 20, and into the chamber.

Flow from chamber 12 is through passage 22, conduit 24, and to an exemplary gage head 25 having opposed orifices for measuring the internal diameter of a workpiece 27. It will be appreciated by those skilled in the art that the flow from gage head 25 will be controlled by the clearance between the internal wall of part 27 and the orifices of the gage head. Variations in the diameter gaged will result directly in variations in flow from gage head 25 and chamber 12.

An elongated pressure controlling or regulating member 30 is slidably guided at 31 in body 11. One end 34 of controlling member 30 is in positioning engagement with a washer 36 carried by diaphragm 14. A flow controlling surface 37 is provided by ball 38 at one location along member 30. Spring 39 cooperates between body 11 and ball 38 to maintain end 34 of member 30 in positioning engagement with washer 36.

Movements of member 30 in its pressure regulating function are directly measured by gaging means provided at its other end. As illustrated this gaging means includes a differential transformer unit 40 having an exciter winding 41 and pick-up winding 42. An armature 44 on member 30 is positioned relative to windings 41 and 42 to vary the relationship therebetween in accordance with the position of member 30. Connections to transformer 41 are provided through a coupling 45.

Gaging signals provided by transformer 40 can be used for machine control or other purposes as desired. For example, they can be amplified and indicated by a unit such as shown diagrammatically at 46. A suitable unit for this purpose is illustrated and described in more detail in Patent No. 2,885,660 issued May 5, 1959. Numeral 48 diagrammatically indicates a classifier as shown in detail in patent application 539,484 filed October 10, 1955, which was allowed on June 30, 1960 for classifying gaged parts into different dimensional groups.

Thus it is seen that in the basic gaging circuit flow changes at gage head 25 resulting from different internal diameters of a workpiece 27 are instantly effective as minute pressure changes within chamber 12. Diaphragm 14 responds and positions controlling member 30 and flow controlling surface 37 relative to inlet valve seat 20. Increased flow through gage head 25 allows diaphragm 14 to move in, further separating surface 37 and seat 20 to admit greater flow and restore the pressure level. Decreased flows have the reverse effect.

This means that any flow variations at gage head 25 are instantly detected and continuously compensated for by varying the inlet flow into chamber 12 to maintain the chamber pressure constant, resulting in substantially instantaneous reaction of member 30 to the workpiece dimension. Precision gaging of positions of member 30 as through the armature and transformer arrangement 40 gives rapid gaging signals irrespective of the remoteness of gage head 25 from the primary gaging apparatus. Substantially instant gaging of high precision as provided with the present apparatus is extremely important in many operations, as for example, automatic gaging and correction in a rapidly cycling machine tool.

An opposing pressure is necessary against the opposite side of diaphragm 14 from chamber 12 and in this illustrative embodiment this pressure is provided by a second chamber 50 having its own pressure supply through regulator 51 and conduit 52. Regulator 51 controls the pressure in chamber 50 which in turn determines the operating pressure in chamber 12.

In addition, a further adjustment is provided by means of knob 55 controlling needle valve 56 in a bleed directly to atmosphere from chamber 12. This adjustment is also for obtaining a reference setting prior to gaging and is similar to the "zero" adjustment of conventional gaging systems.

A further knob 58 controls a needle valve 59 in a passage 60 between second chamber 50 and gaging chamber 12, providing an effective by-pass for flow. This adjustment can be utilized to vary the amplification of apparatus 10. That is to say for the same flow change through gage head 25 adjustments of knob 58 will obtain different deflection ranges of diaphragm 14.

The operation of this by-pass for amplification adjustment 58 can be best visualized if it is initially considered that with needle valve 59 fully opened no movement of diaphragm 14 would occur regardless of the magnitude of flow changes through gage head 25. As needle valve 59 is closed through rotation of knob 58 increasingly greater deflections of diaphragm 14 will occur for greater amplified responses.

Through control of knobs 55 and 58 and the regulators in the system, apparatus 10 can be precisely set up to provide the desired gaging response prior to gaging. These adjustments are commonly utilized in connection with reference masters.

Thus it is seen that a unique variable flow, constant pressure pneumatic gaging circuit has been provided. Rapidly responsive gaging signals are obtained by measuring the positions of a member which moves to maintain constant pressures under varying flow conditions resulting from differences in gaged dimensions. Through the unique structure of this apparatus an extremely simple and reliable mechanism is made possible. The various adjustments provided insure that rapid and accurate preliminary adjustments can be obtained prior to gaging.

While the form of apparatus herein described constitutes a preferred embodiment of the invention, it is to be understood that the invention is not limited thereto, and that changes may be made therein without departing from the scope of the invention which is defined in the appended claims.

What is claimed is:

1. Gaging apparatus including a first pressure regulator for receiving air under pressure and providing a constant pressure supply, an auxiliary pressure regulator and a gage head which controls flow in accordance with a gaged product characteristic, passage means for connection to a source of fluid under pressure, said passage means placing said first pressure regulator, auxiliary pressure regulator and gage head in series communication in the order claimed, said auxiliary pressure regulator having a flexibly movable pressure controlling member automatically operative to maintain supply pressure to said gage head constant under varying flows through said gage head, and gaging means having a direct operative connection to said member for measuring its position.

2. Gaging apparatus including means providing a fluid pressure chamber having a pressure responsive movable wall portion, outlet means for said chamber adapted for connection to a gage head which controls flow in accordance with a gaged product characteristic, inlet means for said chamber for connection to a source of fluid under controlled pressure including a constant pressure supply regulator, a flow control valve in said inlet means downstream of said supply regulator controlled by said movable wall portion in accordance with the chamber pressure applied against one side of said movable wall portion and operative to maintain said pressure constant under varying flow conditions through said outlet means, and pressure applying means operative on said wall portion in opposition to the chamber pressure for maintaining a constant opposing pressure independent of pressure conditions within said chamber and gaging means controlled by the position of said valve during its flow control movements.

3. Gaging apparatus including means providing a fluid pressure chamber, a flexible diaphragm forming one wall of said chamber, outlet means for said chamber adapted for connection to a gage head which controls flow in accordance with a gaged product characteristic, inlet means for said chamber for connection to a source of fluid under a constant controlled pressure including a valve seat, a flow control member cooperating with said seat and operatively connected to said diaphragm for movement therewith to provide increased flow into said chamber in response to decreased chamber pressure, whereby flow into said chamber is controlled to maintain a constant chamber pressure under varying flow conditions through said outlet means, pressure applying means operative on said diaphragm in opposition to the chamber pressure for maintaining a constant opposing pressure independent of pressure conditions within said chamber and gaging means directly responsive to positions of said control member for measuring displacements thereof during its flow controlling function.

4. Gaging apparatus including means providing a fluid pressure chamber having a pressure responsive movable wall portion, outlet means for said chamber adapted for connection to a gage head which controls flow in accordance with a gaged product characteristic, inlet means for said chamber for connection to a source of fluid under a constant pressure including a valve seat, an elongated control member supported for endwise movement in said apparatus, means maintaining one end of said control member in positioning engagement with said wall portion, said control member having a valve surface at one location therealong cooperating with said valve seat to control flow into said chamber and maintain a constant chamber pressure, pressure applying means operative on said wall portion in opposition to the chamber pressure for maintaining a constant opposing pressure independent of pressure conditions within said chamber and gaging means in operative association with said control member adjacent its other end including a differential transformer and a cooperating armature positioned by said control member responsive to positions thereof during its flow controlling function.

5. Gaging apparatus including means providing a fluid pressure chamber, a flexible diaphragm member forming one wall of said chamber and subjected on one side to pressures therein, outlet means for said chamber adapted for connection to a gage head which controls flow in accordance witht a gaged product characteristic, inlet means for said chamber for connection to a source of fluid under a constant pressure including a valve seat, a control member positioned by said diaphragm member having a flow control surface cooperating with said valve seat operative to maintain the chamber pressure constant under varying flow conditions through said outlet means, gaging means directly responsive to the position of said control member during its flow controlling function, yieldable means at the opposite side of said diaphragm member operative to maintain a substantially constant force thereagainst in opposition to chamber pressures and independent thereof, and an adjustable relief to atmosphere from said chamber for obtaining reference settings prior to gaging.

6. Gaging apparatus including a flexible diaphragm, means providing a first pressure chamber at one side thereof, outlet means for said first chamber adapted for connection to a gage head which controls flow from said chamber in accordance with a gaged product characteristic, inlet means for said first chamber for connection to a source of fluid under a constant pressure including a valve seat, a control member positioned by said diaphragm having a flow controlling surface cooperating with said valve seat to control flow into said first chamber and maintain chamber pressure constant, gaging means responsive to positions of said control member during its flow controlling movements, means providing a second pressure chamber at the other side of said diaphragm, connection means to said second chamber for connection to a source of fluid under a constant independently controlled pressure, and a manually adjustable valve connection across said diaphragm from said second chamber to said first chamber for controlling the effective magnitude of diaphragm movement in response to varying outlet flow conditions during gaging.

7. Gaging apparatus including a flexible diaphragm, means providing first and second pressure chambers at opposite sides of said diaphragm, outlet means for said first chamber, a gage head operably connected to said outlet means, inlet means for both of said chambers adapted for respective connection to respective sources of fluid under independently controlled pressure, valve means in the inlet means for said first chamber controlled by positions of said flexible diaphragm for maintaining a constant chamber pressure, gaging means responsive to adjustments of said valve means in response to movements of said diaphragm, an adjustable relief to atmosphere from said first chamber for obtaining reference settings prior to gaging, and an adjustable valve connection across said diaphragm from said second to said first chamber for controlling the effective movement of said diaphragm under changing flow conditions from said first chamber.

References Cited in the file of this patent

UNITED STATES PATENTS

| | | |
|---|---|---|
| 2,627,183 | Greenwood et al. | Feb. 3, 1953 |
| 2,669,246 | Segerstad | Feb. 16, 1954 |
| 2,881,528 | Moore | Apr. 14, 1959 |

FOREIGN PATENTS

| | | |
|---|---|---|
| 1,116,211 | France | Jan. 30, 1956 |